(12) United States Patent
Minamino et al.

(10) Patent No.: US 8,072,852 B2
(45) Date of Patent: Dec. 6, 2011

(54) OPTICAL DISC DEVICE

(75) Inventors: Junichi Minamino, Nara (JP); Katsuya Watanabe, Nara (JP); Akira Yoshikawa, Nara (JP)

(73) Assignee: Panasonic Corporation, Osaka (JP)

( * ) Notice: Subject to any disclaimer, the term of this patent is extended or adjusted under 35 U.S.C. 154(b) by 777 days.

(21) Appl. No.: 12/090,540

(22) PCT Filed: Nov. 21, 2006

(86) PCT No.: PCT/JP2006/323166
§ 371 (c)(1),
(2), (4) Date: Apr. 17, 2008

(87) PCT Pub. No.: WO2007/063740
PCT Pub. Date: Jun. 7, 2007

(65) Prior Publication Data
US 2009/0122669 A1 May 14, 2009

(30) Foreign Application Priority Data
Nov. 30, 2005 (JP) .................. 2005-346493

(51) Int. Cl.
*G11B 7/00* (2006.01)
(52) U.S. Cl. ............ 369/44.28; 369/47.15; 369/53.28; 369/44.26
(58) Field of Classification Search .......... None
See application file for complete search history.

(56) References Cited

U.S. PATENT DOCUMENTS

| | | |
|---|---|---|
| 4,701,897 A | 10/1987 | Nakagawa |
| 4,730,290 A | 3/1988 | Takasago et al. |
| 4,796,247 A * | 1/1989 | Vogelsang .................. 369/44.28 |
| 5,771,214 A | 6/1998 | Saga |
| 6,552,983 B1 | 4/2003 | Yoshida et al. |
| 6,947,364 B1 * | 9/2005 | Hogan et al. ............... 369/53.45 |
| 2003/0112728 A1 * | 6/2003 | Ono et al. .................. 369/53.18 |
| 2004/0047251 A1 * | 3/2004 | Minamino et al. ........... 369/47.3 |

FOREIGN PATENT DOCUMENTS

| | | |
|---|---|---|
| EP | 1 156 481 | 11/2001 |
| JP | 61-216129 | 9/1986 |

(Continued)

OTHER PUBLICATIONS

International Search Report for corresponding Application No. PCT/JP2006/323166 dated Feb. 27, 2007.

*Primary Examiner* — Joseph Haley
*Assistant Examiner* — Ifedayo Iluyomade
(74) *Attorney, Agent, or Firm* — Renner, Otto, Boisselle & Sklar, LLP

(57) ABSTRACT

An optical disc drive according to the present invention can write data on both a write-once disc and a rewritable disc. The drive includes: a disc recognizing section 110 for recognizing the type of a given optical disc as a write-once disc or a rewritable disc; and track skipping detection signal generating section, which outputs track skipping detection signal when a first condition on tracking error is satisfied if the given optical disc, on which data is being written, has turned out to be a write-once disc. On the other hand, if the given optical disc has turned out to be a rewritable disc, the track skipping detection signal generating section outputs track skipping detection signal when a second condition on tracking error, which is different from the first condition, is satisfied. A control section stops writing the data in response to the track skipping detection signal while the data is being written.

10 Claims, 10 Drawing Sheets

FOREIGN PATENT DOCUMENTS

| | | |
|---|---|---|
| JP | 07-262578 | 10/1995 |
| JP | 08-045079 | 2/1996 |
| JP | 09-204674 | 8/1997 |
| JP | 2000-222750 | 8/2000 |
| JP | 2001-056936 | 2/2001 |
| JP | 2003-272161 | 9/2003 |

* cited by examiner

| | REWRITABLE DISC | | | | | |
|---|---|---|---|---|---|---|
| | RECORDING BLOCK | | ADJACENT TRACK | | DISC | |
| | ERROR PROCESSING | NEGLECT | ERROR PROCESSING | NEGLECT | ERROR PROCESSING | NEGLECT |
| (a) INWARD TRACK SKIPPING | ○ | × | ○ | × | ○ | × |
| (b) OUTWARD TRACK SKIPPING | ○ | × | ○ | ○ | ○ | × |
| (c) INWARD TRACKING ERROR | ○ | ○ | ○ | ○ | ○ | ○ |
| (d) OUTWARD TRACKING ERROR | ○ | ○ | ○ | ○ | ○ | ○ |

(b)

| | WRITE-ONCE DISC | | | | | |
|---|---|---|---|---|---|---|
| | RECORDING BLOCK | | ADJACENT TRACK | | DISC | |
| | ERROR PROCESSING | NEGLECT | ERROR PROCESSING | NEGLECT | ERROR PROCESSING | NEGLECT |
| (a) INWARD TRACK SKIPPING | × | × | ○ | × | × | × |
| (b) OUTWARD TRACK SKIPPING | × | × | ○ | × | × | × |
| (c) INWARD TRACKING ERROR | × | ○ | ○ | ○ | × | ○ |
| (d) OUTWARD TRACKING ERROR | × | ○ | ○ | ○ | × | ○ |

OPTICAL DISC DEVICE

TECHNICAL FIELD

The present invention relates to an optical disc drive that can write data on both rewritable optical discs and write-once ones alike. The present invention also relates to an optical disc controller and a drive method for use in such an optical disc drive.

BACKGROUND ART

Data stored on an optical disc can be read out from the disc by irradiating the rotating disc with a relatively weak light beam with a constant intensity, and detecting the light that has been modulated by, and reflected from, the optical disc.

On a read-only optical disc, information is already stored as pits that are arranged spirally during the manufacturing process of the optical disc. On the other hand, on a rewritable optical disc and a write-once optical disc, a recording material film, from/on which data can be read and written optically, is deposited by an evaporation process, for example, on the surface of a base material on which tracks with spiral lands or grooves are arranged.

In writing data on such a rewritable or write-once optical disc, data is written there by irradiating the optical disc with a light beam, of which the optical power has been changed according to the data to be written, and locally changing the properties of the recording material film.

It should be noted that the depth of the tracks and the thickness of the recording material film are smaller than the thickness of the optical disc base material. For that reason, those portions of the optical disc, where data is stored, define a two-dimensional plane, which is sometimes called an "information storage plane". However, considering that such an "information storage plane" actually has a physical dimension in the depth direction, too, the term "information storage plane" will be replaced herein by another term "information storage layer". Every optical disc has at least one such information storage layer. Optionally, a single information storage layer may actually include a plurality of layers such as a phase-change material layer and a reflective layer.

To write data on a rewritable optical disc or a write-once optical disc or to read data that is stored on such an optical disc, the light beam always needs to maintain a predetermined converging state on a target track on an information storage layer. For that purpose, a "focus control" and a "tracking control" are required. The "focus control" means controlling the position of an objective lens perpendicularly to the information storage layer such that the focus position of the light beam is always located on the information storage layer. On the other hand, the "tracking control" means controlling the position of the objective lens along the radius of a given optical disc (which direction will be referred to herein as a "disc radial direction") such that the light beam spot is always located right on a target track.

Various types of optical discs such as DVD (digital versatile disc)-ROM, DVD-RAM, DVD-RW, DVD-R, DVD+RW and DVD+R have become more and more popular these days as storage media on which a huge amount of information can be stored at a high density. Meanwhile, CDs (compact discs) are still popular now. Recently, there are increasing demands for optical discs with storage capacity that is big enough to store high-definition data, and Blu-ray Disc (BD) has been developed to meet such demands. Although BD-RE, which is a rewritable optical disc, has already been put on the market, BD-R, which is a write-once optical disc that can be produced at a lower cost than BD-RE, has also been under development.

In write data on an optical disc with a narrow track pitch such as a BD, the tracking control on such an optical disc needs to be carried out with particularly high precision. The tracking control might lose its stability due to the impact the optical disc is subjected to while data is being written there, defects on the optical disc or some scratches or dust on the surface of the disc. If the tracking control lost its stability for any of these reasons while data is being written on a target track, then the converged spot of the light beam might go off the track and the data could be written on an adjacent track by mistake.

In the prior art, if the magnitude of the tracking error that has been detected based on the magnitude of a tracking error signal is equal to or greater than a predetermined value, it is determined that "track skipping" have occurred and that the data stop being written immediately.

According to the technique disclosed in Patent Document No. 1, if defect detecting means has detected defects on an optical disc, even an increase in the level of a tracking error signal is regarded as resulting from those defects, not due to "track skipping". On the other hand, Patent Document No. 2 discloses a technique for sensing "track skipping" by detecting address pits that are arranged between tracks.

Patent Document No. 1: Japanese Patent Application Laid-Open Publication No. 2003-272161

Patent Document No. 2: Japanese Patent Application Laid-Open Publication No. 2001-56936

DISCLOSURE OF INVENTION

Problems to be Solved by the Invention

If the method for detecting "track skipping" based on a tracking error signal were adopted, however, data could stop being written even if the converged spot of the light beam actually did not reach an adjacent track. Also, in a situation where there is some eccentricity in an optical disc rotating, even if the tracking control is being performed properly, the tracking error signal could still have some variation. In that case, "track skipping" could be detected by mistake and writing of data could come to a halt unnecessarily.

If "track skipping" were detected by mistake and data stopped being written even though actually no data has been written on any adjacent track erroneously, a write-once optical disc would have a non-readable area, which is a problem.

On the other hand, if the method for detecting "track skipping" based on the discontinuity of physical addresses, for example, instead of a tracking error signal, were adopted, then the tracking error could not be sensed quickly until that track skipping actually happens. That is to say, in detecting track skipping based on the discontinuity of physical addresses, the light beam spot on the optical disc should move to an adjacent track as a result of that track skipping and logical addresses should be read continuously while following that track for a predetermined amount of time or more. That is why according to this method, the track skipping can be detected almost without fail. But if data had already been written on the adjacent track, that data would be partially destroyed or erased. For that reason, in the prior art, a method for detecting track skipping quickly based on a tracking error signal has been adopted, no matter whether the given optical disc is rewritable or write-once.

In order to overcome the problems described above, the present invention has an object of providing an optical disc drive that can detect track skipping more efficiently on both write-once discs and rewritable discs.

Another object of the present invention is to provide an optical disc controller and a drive method for use in such an optical disc drive.

Means for Solving the Problems

An optical disc drive according to the present invention can write data on both a write-once disc and a rewritable disc. The drive includes: disc recognizing means for recognizing the type of a given optical disc as a write-once disc or a rewritable disc; track skipping detection signal generating means for outputting track skipping detection signal when a first condition on tracking error is satisfied if the given optical disc, on which data is being written, has turned out to be a write-once disc or when a second condition on tracking error, which is different from the first condition, is satisfied if the given optical disc has turned out to be a rewritable disc; and a control section for stopping writing the data on receiving the track skipping detection signal while the data is being written.

In one preferred embodiment, if the given optical disc is a write-once disc that accepts alternative processing about writing, the second condition is applied instead of the first condition on tracking error.

In another preferred embodiment, the first condition is that physical addresses being read while the data is being written have any discontinuity.

In still another preferred embodiment, the second condition is that the addresses being read while the data is being written have any discontinuity or that the absolute value of a tracking error signal exceeds a predetermined value.

In a specific preferred embodiment, if the disc recognizing means has recognized the given optical disc as a write-once disc, the first condition is modified according to the specific type or the format of the write-once disc.

In another specific preferred embodiment, if the disc recognizing means has recognized the given optical disc as a rewritable disc, the second condition is modified according to the specific type or the format of the rewritable disc.

In yet another preferred embodiment, the track skipping detection signal generating means includes: first track skipping detecting means for generating a first detection signal on detecting track skipping by discontinuity of physical addresses; and second track skipping detecting means for generating a second detection signal on detecting track skipping based on a tracking error signal. Based on the result of the decision made by the disc recognizing means, at least one of the first and second detection signals is output as the track skipping detection signal.

In a specific preferred embodiment, if the disc recognizing means has recognized the given optical disc as a write-once disc, the second track skipping detecting means is either disabled or inactivated.

In another preferred embodiment, the optical disc drive further includes track skipping detection signal generating means for detecting track skipping and level selecting means for setting an estimated level at which the track skipping should have occurred. The levels set by the level selecting means are changed based on the result of the decision made by the disc recognizing means.

In a specific preferred embodiment, the level to be set when the disc recognizing means recognizes the given optical disc as a write-once disc is defined to be higher than the level to be set when the disc recognizing means recognizes the given optical disc as a rewritable disc.

In yet another preferred embodiment, the track skipping detection signal generating means includes detection timing setting means for setting a timing to determine that track skipping has occurred, and the timings to be set by the detection timing setting means are changed based on a result of the decision made by the disc recognizing means.

In a specific preferred embodiment, the timing to be set where the disc recognizing means recognizes the given optical disc as a write-once disc is defined to be later than the timing to be set where the disc recognizing means recognizes the given optical disc as a rewritable disc.

In yet another preferred embodiment, if the given optical disc is a write-once disc, the control section stops writing the data on finding the second condition satisfied until a prescribed amount of time passes since the start of writing.

In this particular preferred embodiment, the optical disc drive includes: write time counting means for counting the amount of time that has passed since the start of writing; and the track skipping detection signal generating means for generating the track skipping detection signal based on a result of the decision made by the disc recognizing means and on the amount of time passed that has been counted by the write time counting means. As soon as the track skipping detection signal generating means detects track skipping while the data is being written, the control section stops writing the data.

In yet another preferred embodiment, if the disc recognizing means has recognized the given optical disc as a write-once disc, the track skipping detection signal generating means either inactivates or disables the second track skipping detecting means from detecting track skipping toward an outer edge of the disc until the write time counting means counts the prescribed amount of time. But once the write time counting means has counted the prescribed amount of time, the track skipping detection signal generating means either inactivates or disables the second track skipping detecting means from detecting track skipping toward both inner and outer edges of the disc.

In another preferred embodiment, the track skipping detection signal generating means includes level selecting means for setting an estimated level at which the track skipping should have occurred. The levels set by the level selecting means are changed based on the result of the decision made by the disc recognizing means.

In a specific preferred embodiment, the level to be set where the disc recognizing means recognizes the given optical disc as a write-once disc is defined to be higher than the level to be set where the disc recognizing means recognizes the given optical disc as a rewritable disc.

In yet another preferred embodiment, the track skipping detection signal generating means includes detection timing setting means for setting a timing to determine that track skipping has occurred, and the timings to be set by the detection timing setting means are changed based on a result of the decision made by the disc recognizing means.

In a specific preferred embodiment, the timing to be set where the disc recognizing means recognizes the given optical disc as a write-once disc is defined to be later than the timing to be set where the disc recognizing means recognizes the given optical disc as a rewritable disc.

An optical disc controller according to the present invention is used in an optical disc drive having the ability to write data on both a write-once disc and a rewritable disc. The optical disc controller stops writing data when a first condition on tracking error is satisfied if the given optical disc, on which the data is being written, has turned out to be a write-once disc or when a second condition on tracking error, which is different from the first condition, is satisfied if the given optical disc has turned out to be a rewritable disc.

An optical disc drive driving method according to the present invention is a method for driving an optical disc drive having the ability to write data on both a write-once disc and a rewritable disc. The method includes the steps of: recognizing a given optical disc as a write-once disc or a rewritable disc; outputting track skipping detection signal when a first condition on tracking error is satisfied if the given optical disc, on which data is being written, has turned out to be a write-once disc or when a second condition on tracking error, which is different from the first condition, is satisfied if the given optical disc has turned out to be a rewritable disc; and stopping writing the data on receiving the track skipping detection signal while the data is being written.

Effects of the Invention

An optical disc drive according to the present invention includes disc recognizing means for recognizing the type of a given optical disc as a write-once optical disc or a rewritable optical disc, and selects one of two different levels for detecting "track skipping" depending on whether the given optical disc is a write-once one or a rewritable one. As a result, the track skipping can be detected even more effectively on both write-once discs and rewritable discs.

In a preferred embodiment of the present invention, the track skipping is detected quickly based on a tracking error signal as for rewritable discs but the track skipping is detected based on discontinuity of logical addresses as for write-once discs. By changing the conditions for detecting the track skipping appropriately according to the type of the given optical disc in this manner, proper processing can be done on each of these two types of optical discs.

BRIEF DESCRIPTION OF DRAWINGS

FIGS. 2(a) and 2(b) are tables showing the degrees of reliability of a rewritable optical disc and a write-once optical disc, respectively, while the tracking control is not working.

Figure 1:
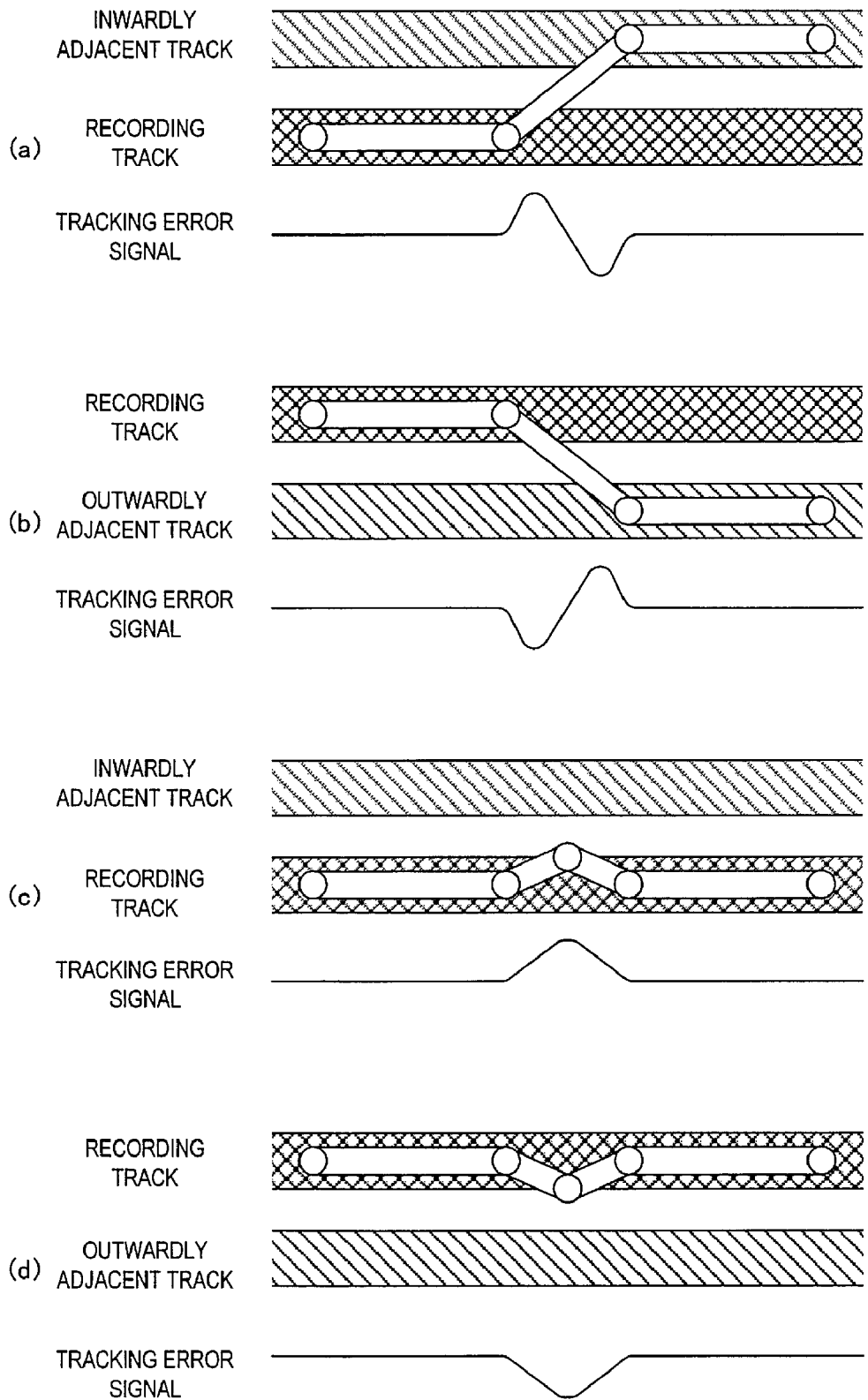
FIGS. 1(a) through 1(d) illustrate various situations where tracking control is not working.

DESCRIPTION OF REFERENCE NUMERALS 101 optical disc
102 optical head
103 tracking drive section
104 signal generating section
105 tracking servo section
106 address detecting section
107 management information reading section
108 first track skipping detecting section
109 second track skipping detecting section
110 disc recognizing section
111 OR circuit
112 control section
113 read/write switching section
114 laser driver section
115 laser diode
116 collimator lens
117 beam splitter
118 objective lens
119 photodetector

BEST MODE FOR CARRYING OUT THE INVENTION

In a preferred embodiment of an optical disc drive according to the present invention, if the given optical disc has been recognized as a rewritable disc, the optical disc drive attempts to detect "track skipping" based on a tracking error signal. On the other hand, if the given optical disc has been recognized as a write-once disc, then the optical disc drive either disables or inactivates the function of detecting the "track skipping" based on a tracking error signal. In this manner, it is possible to avoid an unwanted situation where data stops being written unnecessarily even though not "track skipping" but just a "tracking error" has occurred and to prevent a write-once optical disc from getting partially unreadable.

As is well known in the art, a tracking control based on a tracking error signal is a most common tracking control method for optical discs. The tracking error signal is generated as a signal representing a difference in intensity of light between the inside and outside portions of a track on the disc by using a photodetector, of which the photosensitive area is split into two by a line that is drawn parallel to the direction in which the track runs on the optical disc.

The tracking error signal becomes substantially equal to zero when the light beam spot on an optical disc is located right at the center of the target track. However, as the light beam spot radially shifts more and more from the center of the track, the tracking error signal comes to have an increasing value. The sign of the tracking error signal changes depending on whether the light beam spot has shifted toward the inner or outer edge of the disc. In a normal optical disc drive, by adjusting the position of an objective lens in an optical pickup while a tracking control is being performed, a servo control is carried out to reduce the tracking error signal to almost zero.

Before preferred embodiments of an optical disc drive according to the present invention are described, it will be described with reference to FIGS. 1(a) through 1(d) what types of "track skippings" and "tracking errors" could occur.

Each of the light beam spots shown in FIGS. 1(a) through 1(d) is supposed to follow the track on the optical disc from the left to the right on the paper. FIG. 1(a) illustrates a situation where some disturbance has prevented the light beam spot from following the track on which data should be written (which will be referred to herein as a "recording track") and where the light beam spot has been forced to move to an inwardly adjacent track on the disc. Likewise, FIG. 1(b) illustrates a situation where the light beam spot has come off the recording track and has been forced to move to an outwardly adjacent track on the disc. The situation shown in FIG. 1(a) or 1(b) will be referred to herein as "track skipping". It should be noted that the track skipping refers to not only such a situation where the light beam spot has moved to a track that is adjacent to the target track but also a situation where the light beam spot has moved to a track that is located two or more steps away from the target track.

On the other hand, FIG. 1(c) illustrates a situation where the light beam spot has once shifted from the center of the track toward the inner edge of the disc but has come back to the center of the track without causing track skipping. Likewise, FIG. 1(d) illustrates a situation where the light beam spot has once shifted from the center of the track toward the outer edge of the disc but has come back to the center of the track without causing track skipping. The situation shown in FIG. 1(c) or 1(d) will be referred to herein as a "tracking error". A small tracking error frequently occurs while the tracking control is ON but will not constitute a major obstacle to writing the data.

FIGS. 1(a) through 1(d) show ideal tracking error signals with no noise. Actually, however, a tracking error signal will contain some noise. Also, if the tracking error shown in FIG. 1(c) or 1(d) has occurred, the tracking error signal will actually have a small S-curve. That is why it is very difficult to tell exactly the track skipping from the tracking error based on the tracking error signal. For that reason, if one attempts to sense track skipping based on the tracking error signal, the track skipping will often be detected erroneously, even though it is not track skipping but just a tracking error that has actually happened.

The present inventors discovered that the narrower the track width as in BDs, the more frequently such erroneous decisions tended to be made. A BD has a track pitch of 0.32 µm, which is approximately a half or less of that of a DVD±R/RW (of 0.74 µm) or a DVD-RAM (of 0.62 µm).

As a result of experiments, the present inventors discovered that if there were any abnormal portion (such as a non-uniform thickness of a recording film or an unusual shape of a track groove) on a narrow track such as BD's, the tracking error signal would often have an S-curve such as that shown in FIG. 1(a) or 1(b) and track skipping would often be detected by mistake even though what actually happened was a tracking error such as that shown in FIG. 1(c) or 1(d).

During the manufacturing process of a BD, when a light transmitting layer is formed on the BD's substrate, sometimes air could enter the gap between the light transmitting layer and the substrate to produce bubbles. If there were such bubbles, then the light transmitting layer would warp and lose its flatness locally. Those bubbles typically have a size (diameter) of about 500 µm to about 1,000 µm. If those bubbles were produced between the information layer and the light transmitting layer of a BD, the light transmitting layer would have a locally raised surface due to its small thickness of about 100 µm. The reflected light will hardly return through the core of the bubbles. However, the light beam will be transmitted abnormally through the raised portion that surrounds each of those bubbles. An objective lens for use to perform a read/write operation on a BD has a high NA and is designed to form a focal point on an information layer that is located relatively shallow under the surface of the disc. That is why even if the light transmitting layer were distorted just slightly, the BD would have a significantly changed spherical aberration and an easily variable reflected light intensity. A BD with such bubbles will easily cause S-curve like fluctuations in its tracking error signal.

For these reasons, if the conventional method that stops writing data immediately on sensing track skipping based on a tracking error signal were adopted, the data should stop being written even in a situation where what actually happened was just a tracking error. This would not cause a serious problem with a rewritable disc but should be a huge problem with a write-once disc. This is because to stop writing data on a write-once disc would make the series of data that has been written so far unreadable and would also make it impossible to resume writing data where writing was once stopped.

Hereinafter, it will be described in further detail exactly what types of influences would be left on a write-once disc and on a rewritable disc if data stopped being written halfway.

First, suppose track skipping that has been detected while data is being written on a rewritable disc is ignored. In that case, if not the track skipping shown in FIG. 1(a) or 1(b) but the tracking error shown in FIG. 1(c) or 1(d) has occurred, then data is being written normally. That is why data can be read normally from both the track on which the tracking error has occurred (i.e., the recording track) and a track next to that recording track (i.e., the adjacent track).

Such situations are simply summarized in the table shown in FIG. 2(a) for a rewritable disc. More specifically, these situations are represented in the "neglect" column of the "(c) inward tracking error" and "(d) outward tracking error" rows of a "recording block". In this table, the open circles ○ represent "there is no problem" and the crosses X represent "there is a problem".

On the other hand, in a situation where track skipping such as that shown in FIG. 1(a) or 1(b) has occurred, if data continued to be written as it is, the data would be written erroneously on one of the adjacent tracks as a result of the track skipping. In that case, if the data were written on the inwardly adjacent track on the disc by mistake, then the data stored there would be erased. This is because data is supposed to be written spirally from an inside portion of the disc toward an outside portion thereof. That is why the "neglect" column on the "(a) inward track skipping" row of the "adjacent track" says x (which means non-negligible) in the table shown in FIG. 2(a). However, the "neglect" column on the "(b) outward track skipping" row of the "adjacent track" says ○ (which means negligible). The reason is that even if track skipping occurred toward the outer edge of the disc, no stored data would be erased. In a randomly accessible rewritable disc, however, no matter whether the track skipping has occurred inward or outward on the disc, the adjacent tracks would become unreadable if the track skippings were neglected a number of times.

Next, suppose data stops being written immediately on detecting track skipping on a rewritable disc. This type of processing is called "error processing" in the tables shown in FIGS. 2(a) and 2(b). If this processing is carried out, it is possible to prevent the data on the adjacent track from being erased by overwriting and to rewrite the recording block that has stopped being written halfway. As a result, the reliability of the recording block is not sacrificed. That is why in the table shown in FIG. 2(a), all of the four situations from the (a) inward track skipping through the (d) outward tracking error say ○.

As is clear from the foregoing description, as far as rewritable discs are concerned, it is necessary to prevent data from being written erroneously on adjacent tracks by performing the error processing. That is to say, to maintain the reliability of data being written on rewritable discs, the track skippings should be detected as sensitively as possible. And if there are slightest chances of track skipping, data should stop being written immediately, even though it could have been just a tracking error, not quite track skipping. That is why as for rewritable discs, when either "track skipping" or a "tracking error" with a predetermined level or more has been detected based on a variation in tracking error signal, the data preferably stops being written immediately.

Next, it will be described what if a similar type of processing is carried out on a write-once disc.

As far as write-once discs are concerned, if data stops being written on detecting either track skipping or a tracking error with a predetermined level or more based on a tracking error signal (i.e., if the error processing is performed), then no data will ever be written on adjacent tracks erroneously. That is why as shown in the "error processing" column of the table of FIG. 2(b), data is readable from adjacent tracks just as intended.

However, data is supposed to be written on a write-once optical disc on an error correction block basis for error correction purposes. That is why if data stopped being written halfway, writing of that data could not be resumed where the write operation was suspended. On top of that, since this is a write-once disc, then the recording block cannot be rewritten from the start point through the stop point thereof. As a result, the block in which the data stopped being written is no longer readable. Consequently, the optical disc comes to include a portion where read errors should occur, and therefore, becomes non-usable. Since the recording block itself is no longer readable, the situation remains the same even if what actually happened was just a tracking error, not track skipping. That is why the "error processing" column of the recording block in the table shown in FIG. 2(b) says x in every situation.

Meanwhile, suppose even when a tracking error with a predetermined level or more is detected based on a tracking error signal, the tracking error is neglected and data continues to be written (i.e., the "neglect" processing). In that case, different results will be obtained depending on whether what actually happened was track skipping or just a tracking error. Specifically, if the track skipping such as that shown in FIG. 1(a) or 1(b) occurred and if the light beam spot moved to the inwardly adjacent track on the disc, data would be overwritten on that track, on which another data has already been written and stored, thus making the track no longer readable. On the other hand, if the light beam spot moved to the outwardly adjacent track on the disc (on which no data has been written yet), then the data would be written on that track by mistake. These two situations are represented by x in the table shown in FIG. 2(b). However, in a situation where just a tracking error occurred, then no problem would arise on the adjacent tracks or the recording block even if the data continued to be written. These situations are represented by ○ in the "neglect" column of the table shown in FIG. 2(b).

As is often the case with an optical disc having a narrow track pitch such as a BD, even if track skipping has been detected based on a tracking error signal, what actually happened can be just a tracking error. In view of this consideration, write-once discs would cause a smaller number of problems statistically if the track skipping detected based on a tracking error signal were neglected. Consequently, as far as write-once discs are concerned, even if track skipping or a tracking error with a predetermined level or more has been detected based on a tracking error signal, data preferably continues to be written without stopping writing it. In that case, if track skipping happened actually, then the optical disc would no longer be readable. However, if just a tracking error happened, then the optical disc would still be readable.

An optical disc drive according to the present invention, which was carefully designed and perfected in view of those considerations, includes disc recognizing means for recognizing the type of a given optical disc as a write-once disc or a rewritable disc and track skipping detection signal generating means that operates differently according to the result of the decision made by the disc recognizing means. The track skipping detection signal generating means of the present invention outputs track skipping detection signal when a first condition on tracking error is satisfied if the given optical disc has turned out to be a write-once disc. In a preferred embodiment of the present invention, if it is either highly likely, or there is absolutely no doubt, that track skipping, not a mere tracking error, happened actually, the track skipping detection signal is output. On the other hand, if the given optical disc has turned out to be a rewritable disc, the track skipping detection signal generating means outputs track skipping detection signal when a second condition on tracking error, which is different from (or generally less strict than) the first condition, is satisfied. For example, if a variation that exceeds a reference level has occurred in the tracking error signal, the track skipping detection signal generating means outputs the track skipping detection signal even though what actually happened could be just a tracking error.

The optical disc drive of the present invention includes a control section, which operates so as to stop writing data in response to track skipping detection signal while the data is being written. Thus, in a preferred embodiment, if the given optical disc has turned out to be a write-once disc, data can continue to be written despite the detection of track skipping based on the tracking error signal. That is to say, the write-once disc can be treated differently from the rewritable disc. As a result, as for a write-once BD that often generates an abnormal tracking error signal, it is possible to avoid an unwanted situation where data stops being written halfway carelessly to make the optical disc no longer readable.

Hereinafter, preferred embodiments of an optical disc drive according to the present invention will be described.

Embodiment 1

A first specific preferred embodiment of an optical disc drive according to the present invention will be described with reference to FIG. 3.

Figure 3:
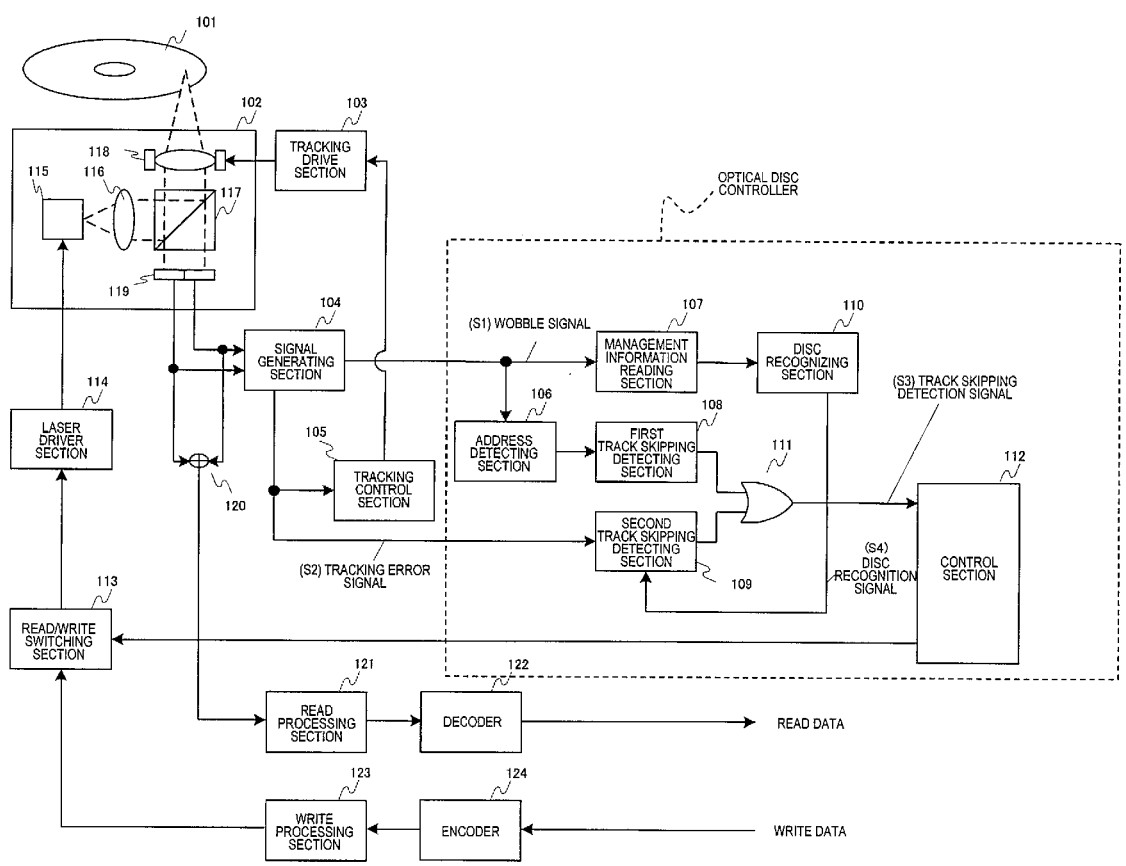
FIG. 3 is a block diagram illustrating an optical disc drive as a first preferred embodiment of the present invention.

The optical disc 101 shown in FIG. 3 may be either a BD-RE (which is a rewritable disc) or a BD-R (which is a write-once disc). On the optical disc 101, there is a spiral track groove, which wobbles with an amplitude of ±10 nm as measured in the radial direction. The wobbled groove basically has a single fundamental frequency. The physical addresses are represented by minimum shift keying (MSK) or sawtooth wobble (STW) defined by the wobble shape.

When the optical disc drive of this preferred embodiment is loaded with the optical disc 101, an optical head 102 irradiates the optical disc 101 with a light beam and performs a focus control such that the converged spot of the light beam (i.e., light beam spot) is located right on the information storage layer of the optical disc 101. Optionally, the optical disc drive of this preferred embodiment may be designed so as to read/write data from/on optical discs other than BDs (such as DVDs). In that case, the operation of recognizing the type of the given optical disc 101 that has been inserted into the optical disc drive needs to be carried out.

In the optical head 102, the light beam emitted from a laser diode (light source) 115 is transformed into a parallel beam by a collimator lens 116. This parallel beam is reflected by a beam splitter 117 and then converged by an objective lens 118 onto the information storage layer of the optical disc 101. The light reflected from the information storage layer is transmitted through the objective lens 118 and the beam splitter 117 and then incident on a photodetector 119. The photodetector 119 has a number of split areas, which generate and output electrical signals representing the respective intensities of the light received there.

A signal generating section 104 performs a differential operation on the electrical signals supplied from the photodetector 119 and then extracts frequency components ranging from DC (0 Hz) through several tens of kHz, thereby generating a tracking error signal S2. Also, the signal generating section 104 extracts signal components falling within a predetermined frequency range (of several tens of kHz through several MHz) from the electrical signals supplied from the photodetector 119 to generate a wobble signal S1, which is used as a signal to read physical addresses.

In accordance with the tracking error signal S2, a tracking control section 105 controls the position of the objective lens 118 such that the converged spot of the light beam follows the target track. More specifically, the tracking control section 105 gets the position of the objective lens 118 adjusted by a tracking drive section 103 such that the tracking error signal S2 goes as close to zero level as possible.

When the optical disc drive is loaded with the optical disc, a transport mechanism (not shown) moves the optical head 102 to the vicinity of an area on the optical disc where management information is stored. A management information reading section 107 acquires management information from the wobble signal S1. In accordance with the management information acquired by the management information reading section 107, a disc recognizing section 110 determines whether the given optical disc is a write-once disc or a rewritable disc and retains its information there. On recognizing the given optical disc as a write-once disc, the disc recognizing section 110 outputs zero as an optical disc recognition signal S4. On the other hand, on recognizing the given optical disc as a rewritable disc, the disc recognizing section 110 outputs one. In this description, a signal in logical low state will be identified herein by "zero" and a signal in logical high state by "one". It should be noted, however, that specific forms of those signals are never limited to what have been described specifically for this preferred embodiment.

When the management information is retrieved from the optical disc 101, the transport mechanism moves the optical head 102 to right under the user area of the optical disc, thus getting the optical disc drive ready to perform a read/write operation on it.

An address detecting section 106 receives the wobble signal S1 from the signal generating section 104 and detects and outputs a physical address from the wobble signal S1 in user data reading/writing and standby states. The physical address is also sent to a first track skipping detecting section 108.

The first track skipping detecting section 108 usually outputs zero in a normal state. However, on finding no continuity in pieces of physical address information that have been received sequentially from the address detecting section 106, the first track skipping detecting section 108 determines that track skipping has occurred. In that case, the first track skipping detecting section 108 outputs one as track skipping information. In this manner, the first track skipping detecting section 108 detects track skipping based on the physical addresses and can sense accurately track skipping that has happened actually. However, it would take a longer time (e.g., 10 to 20 ms) for the first track skipping detecting section 108 to detect the track skipping than a second track skipping detecting section 109 to be described below.

The second track skipping detecting section 109 usually outputs zero in a normal state and receives the optical disc recognition signal S4 from the disc recognizing section 110. If the optical disc recognition signal S4 is zero, the second track skipping detecting section 109 always outputs zero. That is to say, if the given optical disc is a write-once disc, the second track skipping detecting section 109 always outputs zero. On the other hand, if the given optical disc is a rewritable disc (i.e., if the optical disc recognition signal S4 is one), the second track skipping detecting section 109 tries detecting track skipping based on the tracking error signal S2 and outputs one on detecting it. More specifically, if the tracking error signal S2 continues to fall out of a predetermined level range for a predetermined amount of time or more, then the second track skipping detecting section 109 determines that track skipping has occurred and outputs one.

An OR circuit 111 calculates the OR of the outputs of the first and second track skipping detecting sections 108 and 109 and outputs it track skipping detection signal S3.

In accordance with an instruction given by a host computer, for example, the control section 112 controls the read/write operation. More specifically, in reading data (or in a standby state), the control section 112 turns a read/write switching section 113 to a read state. In that state, the read/write switching section 113 instructs a laser driver section 114 to maintain the power of the light beam emitted from the laser 115 at a constant read radiation level of 0.3 mW, for example.

In a read mode, a read processing section 121 performs automatic gain control (AGC), waveform equalization and clock generation on a sum signal generated by an adding section 120, thereby converting the stored data into digital data. A decoder 122 subjects the output of the read processing section 121 to demodulation, error correction and descrambling, thereby outputting read data to the host computer.

Meanwhile, in a write mode in which user data is written on the optical disc 101, the control section 112 turns the read/write switching section 113 to the write mode. In the write mode, an encoder 124 receives write data from the host computer (not shown) and subjects the write data to scrambling, error correction code adding and modulating processing, thereby generating an encoded write signal. A write processing section 123 receives the write signal from the encoder 124 and subjects it to multi-pulse generation and write compensation processing to generate a laser radiation pulse signal. In response, the read/write switching section 113 receives the laser radiation pulse signal from the write processing section 123 and controls the laser driver section 114, which modulates the power of the light beam emitted from the laser 115. While data is being written, the light beam may have an average (recording) power of 4.5 mW, for example.

On receiving the track skipping detection signal S3 in "one" state during the write mode, the control section 112 changes the modes of the read/write switching section 113, which has been performing a write operation, into the read mode, thereby stopping writing the data intentionally. As a result, it is possible to prevent the data from being written on an adjacent track by mistake.

In this preferred embodiment, the management information reading section 107, the disc recognizing section 110, the address extracting section 106, the first and second track skipping detecting sections 108 and 109, the OR circuit 111, and the control section 112 may be implemented by an optical disc controller. These operations may be performed by the hardware of the optical disc controller and/or software processing. Specifically, by designing an appropriate program for a known optical disc controller, the operation of the optical disc drive of this preferred embodiment could be defined.

Also, in this preferred embodiment, the track skipping detection signal generating means as defined by the appended claims is implemented as a combination of the first and second track skipping detecting sections 108 and 109 and the OR circuit 111. According to this preferred embodiment, if the given optical disc has turned out to be a write-once disc, the track skipping detection signal generating means outputs track skipping detection signal when a first condition on tracking error is satisfied (e.g., if there is any discontinuity in physical addresses). On the other hand, if the given optical disc has turned out to be a rewritable disc, the track skipping detection signal generating means outputs track skipping detection signal when a second condition on tracking error is satisfied (e.g., if there is any discontinuity in addresses or if the absolute value of the tracking error signal has exceeded a predetermined value).

Next, the configuration of the first track skipping detecting section 108 that detects track skipping on sensing any discontinuity in addresses will be described with reference to FIG. 4.

Figure 4:
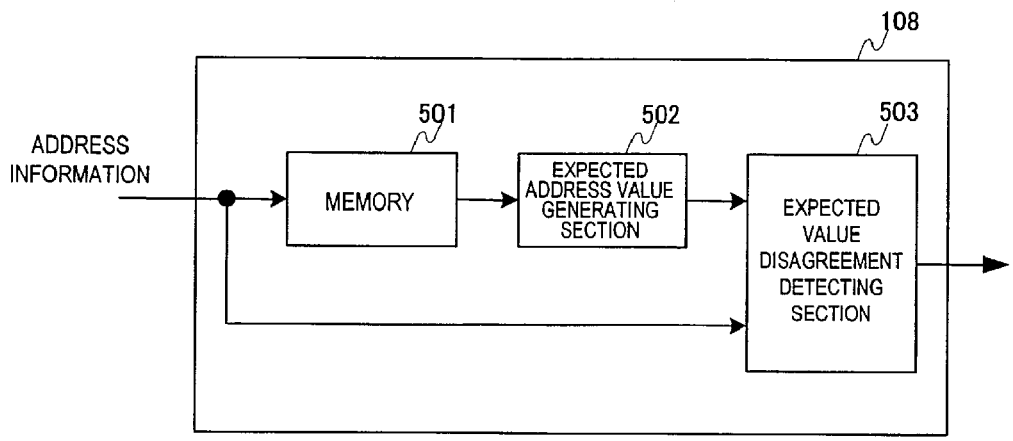
FIG. 4 is a block diagram illustrating a first track skipping detecting sensing according to the first preferred embodiment of the present invention.

The first track skipping detecting section 108 has a configuration such as that shown in FIG. 4, acquires address information from the address detecting section 106 and retains the address information in its internal memory 501. An expected address value generating section 502 generates an expected address to acquire next based on the address information retained in the memory 501 and outputs it. An expected value disagreement detecting section 503 receives the next address that has been detected by the address detecting section 106, and compares the expected address supplied from the expected address value generating section 502 to the actual address supplied from the address detecting section 106. If these two addresses agree with each other, the expected value disagreement detecting section 503 determines that this is a normal state and outputs zero. On the other hand, on finding these two addresses different from each other, the expected value disagreement detecting section 503 determines that track skipping has occurred and outputs one. Thus, if the first track skipping detecting section 108 outputs a signal in "one" state, not a mere tracking error but track skipping must have occurred actually.

In the preferred embodiment described above, addresses are supposed to be detected based on the wobble signal S1. However, any other address detecting method may be adopted as well. For example, if physical addresses are represented by prepits on an optical disc, the track skipping may be detected based on a variation in the address of those prepits.

Next, the configuration of the second track skipping detecting section 109 that detects track skipping based on the tracking error signal will be described with reference to FIG. 5.

When the second track skipping detecting section 109 receives the tracking error signal S2, its internal absolute value generating section 601 generates the absolute value of the tracking error signal S2. A first comparator 602 compares the absolute value of the tracking error signal S2 to a predetermined level Vth. If the tracking error signal S2 is either equal to or greater than Vth or equal to or smaller than −Vth, the first comparator 602 outputs "one". Otherwise, the first comparator 602 outputs "zero".

In this preferred embodiment, even if the absolute value of the tracking error signal (i.e., the magnitude of the tracking error) increases to exceed a predetermined level, it is not determined immediately that track skipping has occurred. Instead, according to this preferred embodiment, it is not until the magnitude of the tracking error continues to be equal or greater than a predetermined level for a prescribed amount of time or more that it is determined that track skipping has occurred as will be described later. It should be noted that even if it is determined that track skipping has occurred, track skipping may have occurred actually but what actually happened may have been just a tracking error. That is to say, the first track skipping detecting section 108 detects track skipping in a strict sense, while the second track skipping detecting section 109 can quickly and sensitively detect, as track skipping, such a state in which a tracking error that would be difficult to tell from track skipping with a tracking error signal occurred.

A counter 603 counts the number of "one" periods of the output of the first comparator 602 at regular intervals and resets the count when the output of the first comparator 602 goes zero. In this manner, the counter 603 detects the time width of the "one" periods. A second comparator 604 outputs zero if the detected value of the counter 603 is equal to or smaller than a predetermined time Tabj but outputs one if the detected value of the counter 603 exceeds Tabj.

An output selecting section 605 receives the optical disc recognition signal S4. If the optical disc recognition signal S4 is one, which means the given optical disc is a rewritable disc, the output selecting section 605 passes the output signal of the second comparator 604. On the other hand, if the optical disc recognition signal S4 is zero, which means the given optical disc is a write-once disc, the output selecting section 605 fixes the output at zero.

As can be seen from the foregoing description, if the given optical disc is a write-once disc, the second track skipping detecting section 109 always outputs a "zero" signal, no matter whether track skipping has been detected or not. In other words, the second track skipping detecting section 109 is substantially disabled with respect to a write-once disc.

Only if the given optical disc is a rewritable disc, the second track skipping detecting section 109 of this preferred embodiment determines that track skipping has occurred when the tracking error signal continues to fall out of the range of −Vth to Vth for more than Tabj. The magnitude of Vth is preferably set to be about a third to about two-thirds of the magnitude of the tracking error signal that is generated when the light beam spot crosses the groove. The predetermined time Tabj is preferably set to be two-thirds or less of a tracking servo response time. By setting Vth and Tabj to these appropriate values in this manner, it is possible to avoid an unwanted situation where a minimal tracking error, not track skipping, is taken for track skipping by mistake. That is to say, by adopting the configuration described above, a situation where obviously just a tracking error has occurred can be neglected.

Optionally, the Vth and Tabj values may be changed according to the type, format and/or linear velocity of the given optical disc. If the average of the tracking error signal has an offset, a high-pass filter may be arranged right before the absolute value generating section 601.

Figure 6:
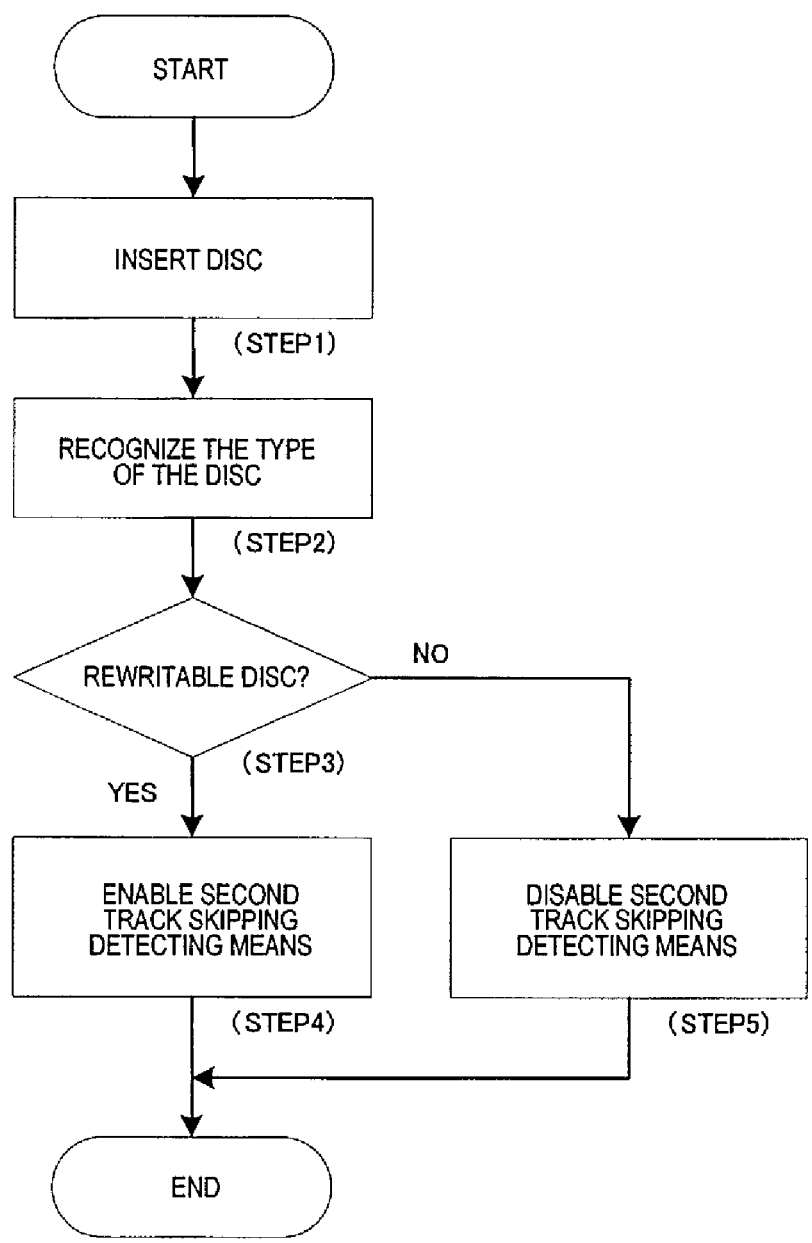
FIG. 6 is a flowchart showing an operating procedure according to the first preferred embodiment of the present invention.

Hereinafter, the procedure of operation according to this preferred embodiment will be described with reference to the flowchart shown in FIG. 6.

When the optical disc drive of this preferred embodiment is loaded with an optical disc in STEP 1, the disc recognizing section 110 shown in FIG. 3 performs a disc type recognition operation in STEP 2. Next, in STEP 3, it is determined whether the given optical disc is a rewritable disc or not.

If the given optical disc has turned out to be a rewritable disc (i.e., if the answer to the query of STEP 3 is YES), the second track skipping detecting section 109 shown in FIG. 3 is enabled in STEP 4. As a result, not just when track skipping is detected on sensing discontinuity of addresses but also when track skipping is detected based on a tracking error signal, track skipping detection signal is output. On the other hand, if the given optical disc has turned out to be a write-once disc, then the second track skipping detecting section 108 is disabled in STEP 5. In that case, the track skipping detection signal is output only when discontinuity of addresses is sensed.

As described above, according to this preferred embodiment, the given optical disc is recognized as either a write-once disc or a rewritable disc and the conditions of track skipping are changed according to the type of the given optical disc recognized. As a result, the track skipping can be detected most appropriately for both write-once and rewritable discs alike.

Embodiment 2

Hereinafter, a second preferred embodiment of an optical disc drive according to the present invention will be described with reference to FIGS. 7 and 8. The optical disc drive of the second preferred embodiment basically has the same configuration as the counterpart of the first preferred embodiment described above except that the second track skipping detecting section of this preferred embodiment has a different configuration and that this preferred embodiment further includes a write time counting section. Thus, the following description will be focused on only those differences from the first preferred embodiment and the description of the other components used in common in these two preferred embodiments will be omitted herein. It should be noted that although the read processing section 121, write processing section 123 and other components contributing to reading and writing data as shown in FIG. 3 are not illustrated in FIG. 7, the optical disc drive of this preferred embodiment actually includes those components, too. The same statement will apply to FIG. 9, too.

Figure 7:
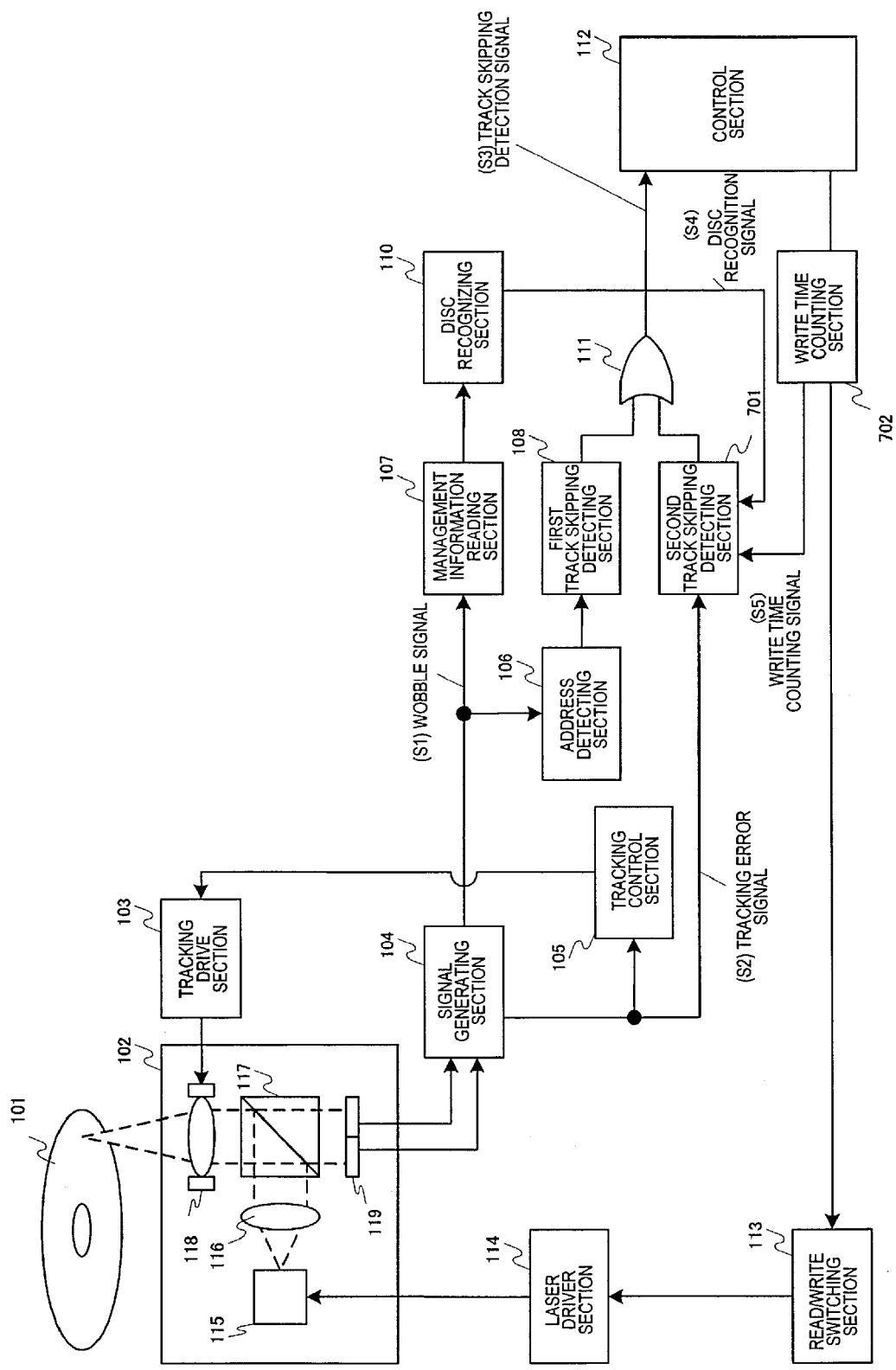
FIG. 7 is a block diagram illustrating an optical disc drive as a second preferred embodiment of the present invention.

In the optical disc drive of this preferred embodiment shown in FIG. 7, the disc recognizing section 110 also outputs a signal in "zero" state as the optical disc recognition signal S4 if the given optical disc has turned out to be a rewritable disc but outputs a signal in "one" state on recognizing the given optical disc as a write-once disc.

In this preferred embodiment, the write time counting section 702 receives a write signal from the control section 112 and counts the amount of time it has passed since the write operation was started. The write time counting section 702 continues to output a signal in "one" state as a write time counting signal S5 until a predetermined amount of time passes since the write operation is started but will output a signal in "zero" state when the predetermined amount of time passes. That predetermined amount of time is preferably equal to the amount of time it would take for the light beam spot to scan the optical disc by following one to ten tracks while the optical disc is rotating.

In accordance with the optical disc recognition signal S4 and the write time counting signal S5, the second track skipping detecting section 701 determines, based on the tracking error signal S2, whether or not track skipping has occurred and then outputs a signal representing the decision result.

The OR circuit 111 outputs the OR of the outputs of the first and second track skipping detecting sections 108 and 701 as track skipping detection signal S3.

Figure 8:
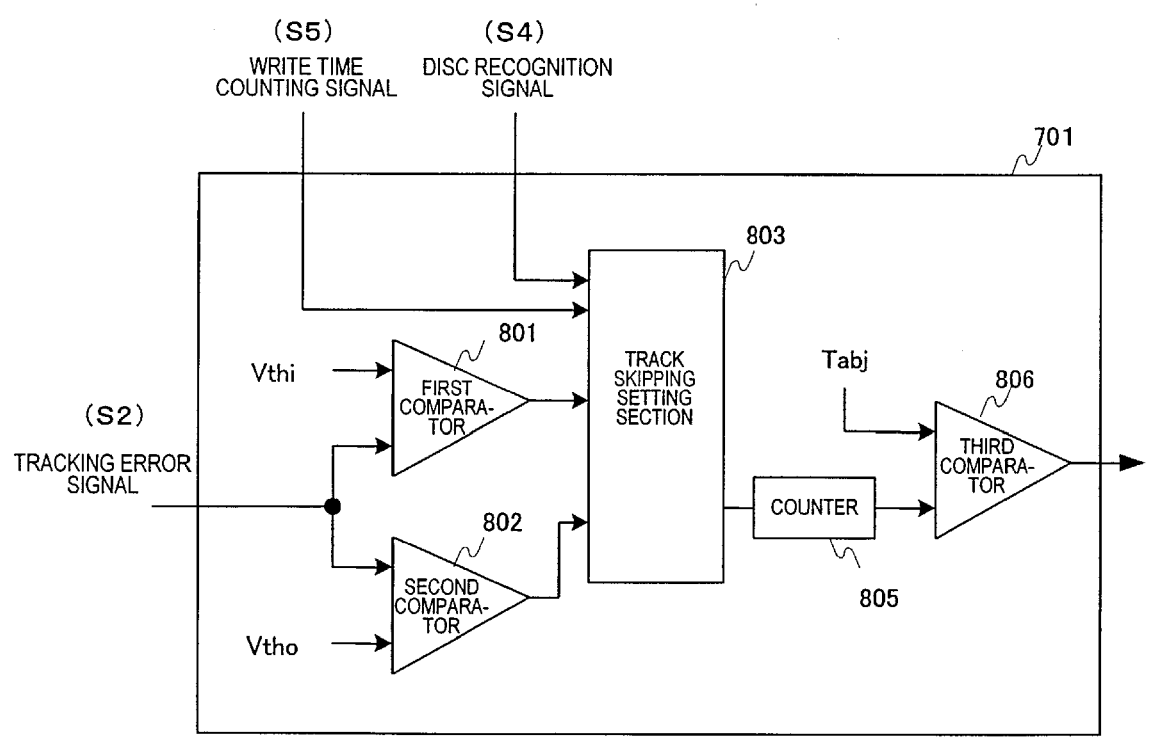
FIG. 8 is a block diagram illustrating a second track skipping detecting sensing according to the second preferred embodiment of the present invention.

Next, look at FIG. 8, which illustrates a configuration for the second track skipping detecting section 701.

A first comparator 801 included in the second track skipping detecting section 701 outputs "one" if the incoming tracking error signal S2 goes equal to or higher than a predetermined level Vthi but outputs "zero" if the tracking error signal S2 goes lower than the predetermined level. On the other hand, a second comparator 802 outputs "one" if the incoming tracking error signal is lower than another predetermined level Vtho but outputs "zero" if the tracking error signal is equal to or higher than the predetermined level. The tracking error signal S2 changes in the positive direction if the light beam spot shifts toward the inner edge of the disc with respect to the guide groove of the optical disc 101 but changes in the negative direction if the light beam spot shifts toward the outer edge of the disc. That is why the first comparator 801 can detect track skipping toward the inner edge of the disc, while the second comparator 802 can detect track skipping toward the outer edge of the disc.

If the optical disc recognition signal S4 is "one" (which means that the given optical disc is a rewritable disc), track skipping signal setting section 803 outputs the OR of the outputs of the first and second comparators 801 and 802. On the other hand, if the optical disc recognition signal S4 is "zero" (which means that the given optical disc is a write-once disc), the track skipping signal setting section 803 passes the output of the first comparator 801 while the write time counting signal S5 is "one" (i.e., until a predetermined amount of time passes since the start of the write operation). However, once the predetermined amount of time passes since the start of the write operation (i.e., when the write time counting signal S5 goes "zero"), the track skipping signal setting section 803 outputs "zero".

In writing additional user data on a write-once disc on which user data has already been written in some area, if track skipping occurred toward the inner edge of the disc right after the write operation has started, another user data would be overwritten on the existent user data, thus destroying the previous user data. In the optical disc drive of this preferred embodiment, however, until a predetermined amount of time passes since the start of the write operation, the track skipping toward the inner edge of the disc is detected based on the tracking error signal such that no data will be written on a write-once disc. As a result, it is possible to prevent the additional data from being overwritten erroneously on the stored data.

In the preferred embodiment described above, until the predetermined amount of time passes, it is determined, only with respect to a tracking error toward the inner edge of the disc, whether or not track skipping has occurred. However, the track skipping may also be detected with respect to a tracking error toward the outer edge of the disc.

Embodiment 3

If an alternative storage area can be found on a write-once disc and if an alternative write operation is instructed, an operation similar to a write retry operation on a rewritable disc can be performed when a write error occurs. In other words, if track skipping has occurred on a write-once disc that accepts the alternative processing, then a recording block on which data could not be written successfully can be written on the alternative storage area on the write-once disc. Thus, as for a write-once disc that accepts the alternative processing, it is possible to achieve as high reliability as a rewritable disc's in a write operation, even though the disc is a write-once one. For that reason, in this third preferred embodiment of the present invention, such a write-once disc that accepts the alternative processing will be regarded as equivalent to a rewritable disc.

Hereinafter, a third preferred embodiment of an optical disc drive according to the present invention will be described with reference to FIG. 9.

Figure 10:
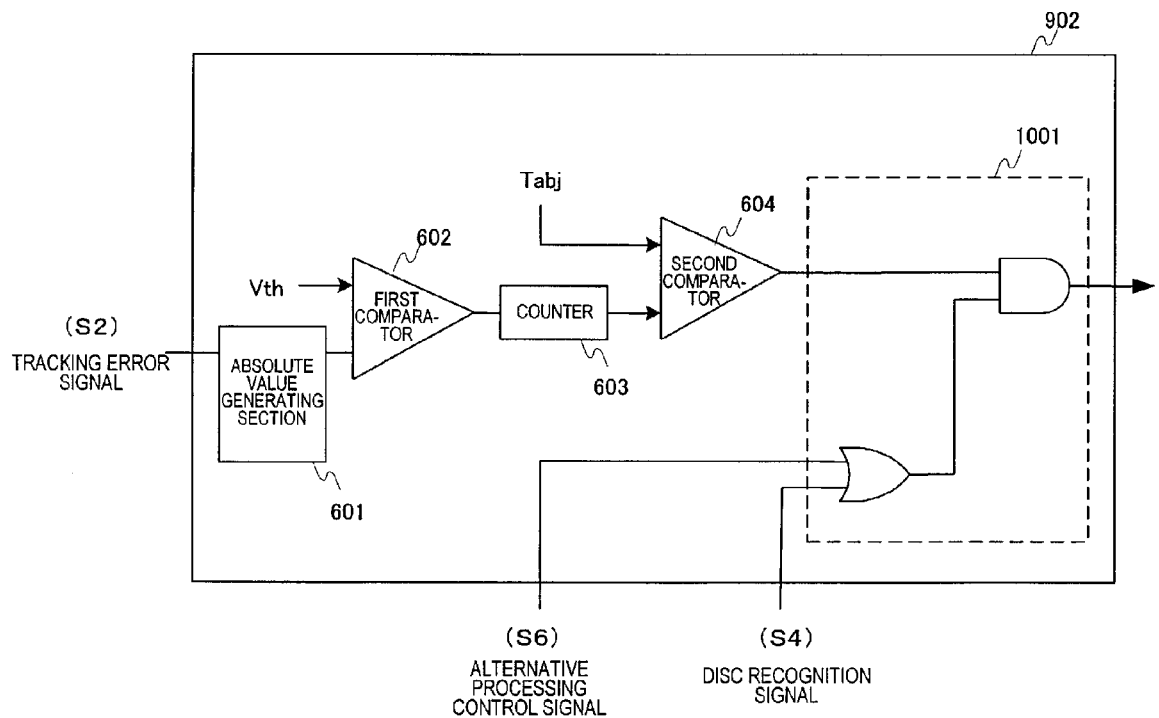
FIG. 10 is a block diagram illustrating a second track skipping detecting sensing according to the third preferred embodiment of the present invention.

The optical disc drive of this preferred embodiment has the same configuration as the counterpart of the first preferred embodiment described above except that this preferred embodiment further includes an alternative processing control section 901 and that the internal configurations of the second track skipping detecting section 902 are changed into that shown in FIG. 10.

Figure 9:
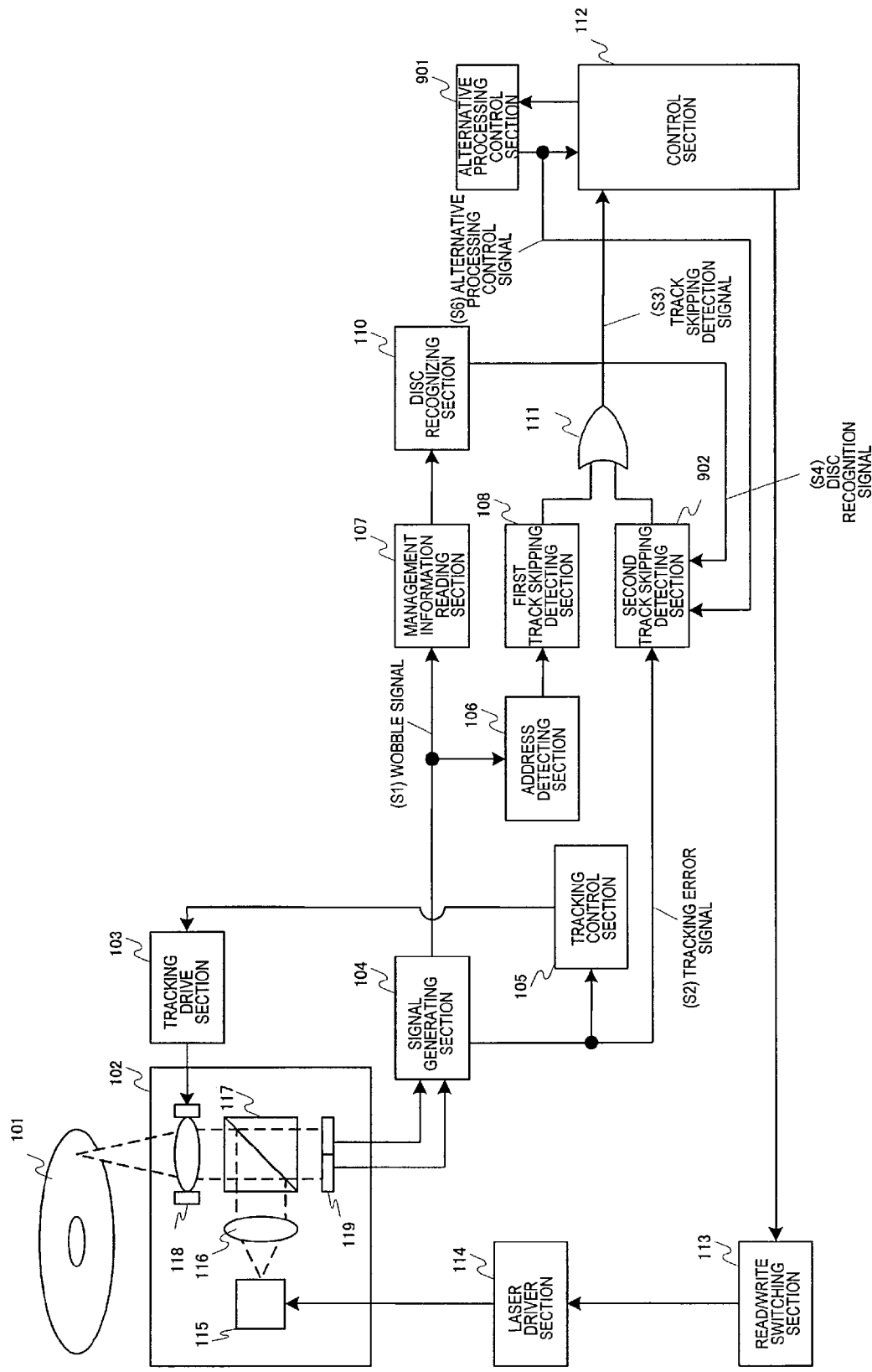
FIG. 9 is a block diagram illustrating an optical disc drive as a third preferred embodiment of the present invention.

The alternative processing control section 901 shown in FIG. 9 is instructed by the control section 112, which follows the host computer's instruction, whether or not to perform the alternative processing during a write operation or receives a write command to perform the alternative processing directly from the host computer. The alternative processing control section 901 changes the levels of an alternative processing control signal S6 to "one" in performing a write operation that accepts the alternative processing but to "zero" otherwise so as not to perform the alternative processing.

A second track skipping detecting section 902 usually outputs "zero" in a normal state. Specifically, if the optical disc recognition signal S4 and the alternative processing control signal S6 are both zero, the second track skipping detecting section 902 always outputs zero. Otherwise, the second track skipping detecting section 902 outputs "one" as a piece of track skipping information when the tracking error signal S2 continues to fall out of the predetermined level range for a prescribed amount of time or more.

In this preferred embodiment, if the given optical disc is a rewritable disc, the control section 112 performs a write retry operation when the track skipping detection signal S3 is generated. On the other hand, if the given optical disc is a write-once disc, the control section 112 performs alternative processing when the track skipping detection signal S3 is generated. It should be noted that even if the given optical disc is a rewritable disc, the alternative processing could be carried out instead of the retry operation as long as the alternative processing is accepted.

As described above, as for a write-once disc that accepts the alternative processing, the optical disc drive of this preferred embodiment does not neglect the track skipping that has been detected by the second track skipping detecting section 902 based on the tracking error signal but stops writing the data and performs the alternative processing.

Next, an exemplary configuration for the second track skipping detecting section 902 will be described with reference to FIG. 10.

When the second track skipping detecting section 902 receives the tracking error signal S2, its internal absolute value generating section 601 generates the absolute value of the tracking error signal S2. A first comparator compares the absolute value of the tracking error signal S2 to a predetermined level Vth. If the tracking error signal S2 is either equal to or greater than Vth or equal to or smaller than –Vth, the first comparator 602 outputs "one". Otherwise, the first comparator 602 outputs "zero".

A counter 603 counts the number of "one" periods of the output of the first comparator 602 at regular intervals and resets the count when the output of the first comparator goes zero. In this manner, the counter 603 detects the time width of the "one" periods. A second comparator 604 outputs zero if the detected value of the counter 603 is equal to or smaller than a predetermined time Tabj but outputs one if the detected value of the counter 603 exceeds Tabj.

An output selecting section 1001 receives the optical disc recognition signal S4. If the optical disc recognition signal S4 is one, which means the given optical disc is a rewritable disc, the output selecting section 1001 passes the output signal of the second comparator 604. On the other hand, if the optical disc recognition signal S4 is zero, which means the given optical disc is a write-once disc, and if the alternative processing control signal S6 is one, which means that the alternative processing is acceptable, the output selecting section 1001 passes the output signal of the second comparator 604. However, if these signals S4 and S6 are both zero, the output selecting section 1001 always outputs zero. As a result, if the given optical disc is a write-once disc that never accepts the alternative processing, the output of the second track skipping detecting section 902 is substantially disabled as is done on that of the second track skipping detecting section 109 of the first preferred embodiment.

As described above, if the given optical disc is either a rewritable disc or a write-once disc that accepts the alternative processing, the second track skipping detecting section 902 determines that track skipping has occurred when the tracking error signal continues to fall out of the range of –Vth to Vth for more than Tabj. The magnitude of Vth is preferably set to be about a third to about two-thirds of the magnitude of the tracking error signal that is generated when the light beam spot crosses the groove. The predetermined time Tabj is preferably set to be two-thirds or less of a tracking servo response time. Optionally, the Vth and Tabj values may be changed appropriately according to the type and/or linear velocity of the given optical disc.

Embodiment 4

In the preferred embodiments described above, if the given optical disc is either a rewritable disc or a write-once disc that accepts alternative processing, the output signal of the second track skipping detecting section is masked in order to disable the detection of track skipping based on the tracking error signal. However, the detection of track skipping based on the tracking error signal may be inactivated or disabled by any other method, not just by masking the output signal.

Figure 5:
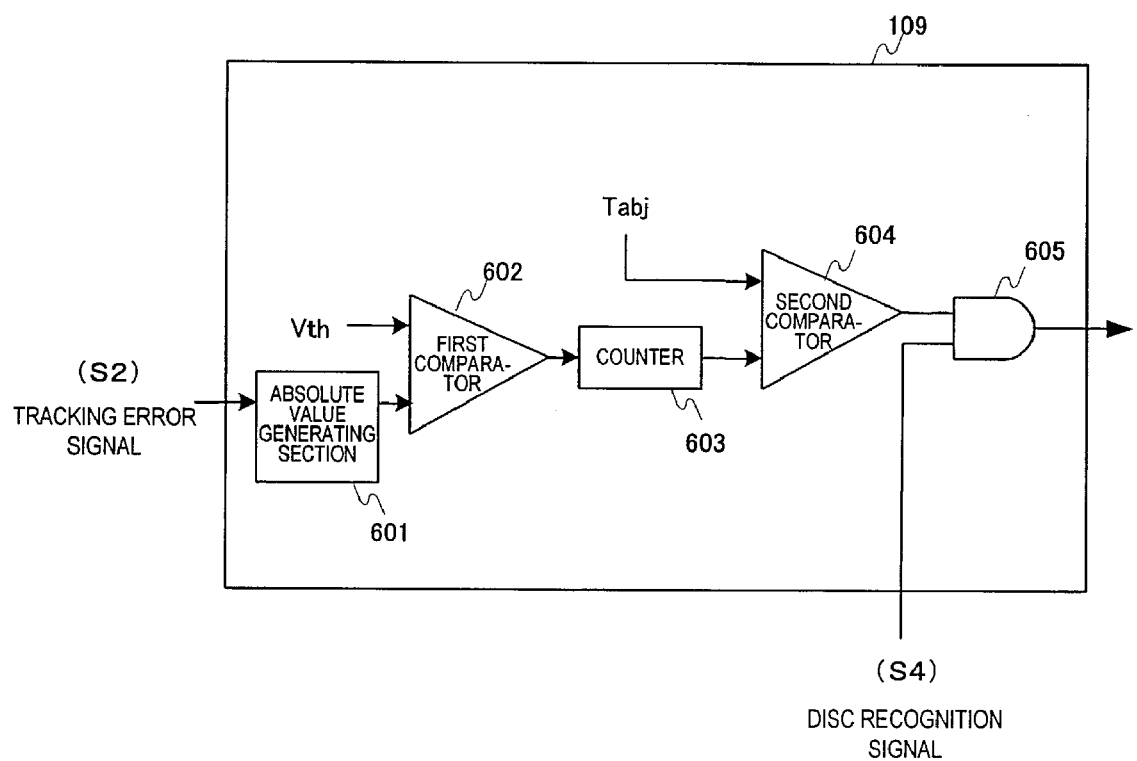
FIG. 5 is a block diagram illustrating a second track skipping detecting sensing according to the first preferred embodiment of the present invention.
Figure 11:
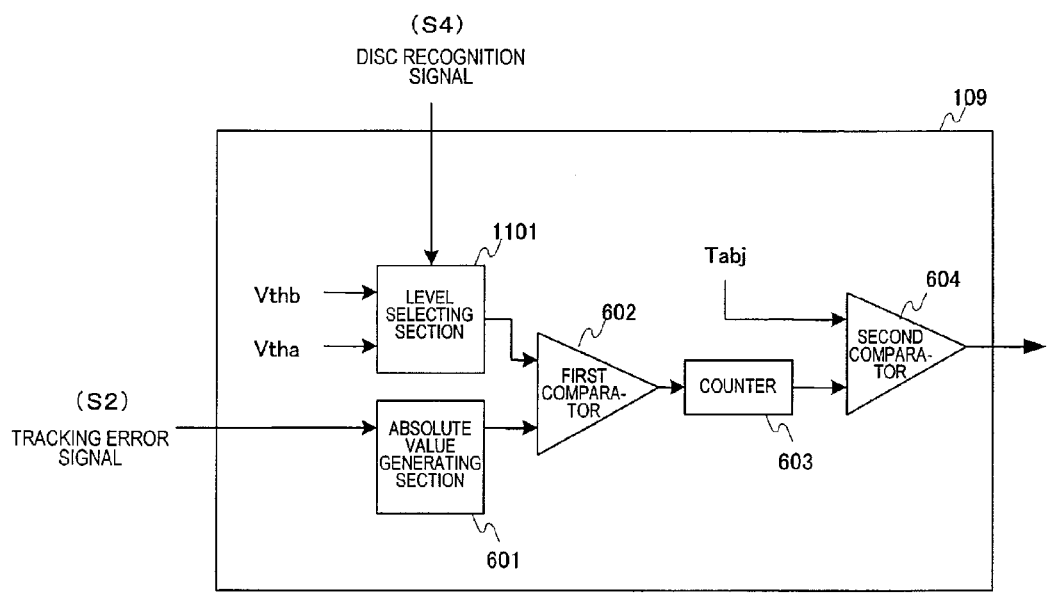
FIG. 11 is a block diagram illustrating a second track skipping detecting sensing according to a fourth preferred embodiment of the present invention.

The optical disc drive of this preferred embodiment is identical with the counterpart shown in FIG. 3 except that the second track skipping detecting section 109 shown in FIG. 5 is replaced with the second track skipping detecting section 109 shown in FIG. 11. Other than that, the optical disc drive of this preferred embodiment has quite the same configuration and operates in the same way as the first preferred embodiment, and the description thereof will be omitted herein.

Next, exemplary configuration and operation of the second track skipping detecting section 109 of this preferred embodiment will be described with reference to FIG. 11.

When the second track skipping detecting section 109 receives the tracking error signal S2, its internal absolute value generating section 601 generates the absolute value of the tracking error signal S2. Meanwhile, if the optical disc recognition signal S4 is "one", which means that the given optical disc is a rewritable disc, a level selecting section 1101 outputs Vtha. On the other hand, if the optical disc recognition signal S4 is "zero", which means that the given optical disc is a write-once disc, the level selecting section 1101 outputs Vthb. In this example, Vthb is supposed to be greater than Vtha.

A first comparator 602 compares the output of the absolute value generating section 601 (i.e., the absolute value of the tracking error signal S2) to the output of the level selecting section 1101.

A counter 603 counts the number of "one" periods of the output of the first comparator 602 at regular intervals and resets the count when the output of the first comparator 602 goes zero. In this manner, the counter 603 detects the time width of the "one" periods. A second comparator 604 outputs zero if the detected value of the counter 603 is equal to or smaller than a predetermined time Tabj but outputs one if the detected value of the counter 603 exceeds Tabj.

As a result, if the given optical disc is a rewritable disc, the second track skipping detecting section 109 outputs "one" when the tracking error signal S2 continues to be either equal to or greater than Vtha or equal to or smaller than −Vtha for more than a predetermined period of time, but outputs "zero" otherwise. On the other hand, if the given optical disc is a write-once disc, the second track skipping detecting section 109 outputs "one" when the tracking error signal S2 continues to be either equal to or greater than Vthb or equal to or smaller than −Vthb for more than a predetermined period of time, but outputs "zero" otherwise. Vthb is defined to be greater than Vtha. That is why if the given optical disc is a write-once disc, the track skipping is not detected unless the tracking error signal varies more significantly than the situation where the given optical disc is a rewritable disc.

Optionally, if Vthb is defined to be a sufficiently large value (e.g., greater than that of the tracking error signal generated when the light beam spot crosses the groove), the detection of track skipping based on the tracking error signal may be disabled.

Embodiment 5

The optical disc drive of this preferred embodiment is identical with the counterpart of the first preferred embodiment shown in FIG. 3 except that the second track skipping detecting section 109 is replaced with yet another different configuration. Other than that, the optical disc drive of this preferred embodiment has quite the same configuration and operates in the same way as the first preferred embodiment, and the description thereof will be omitted herein.

Figure 12:
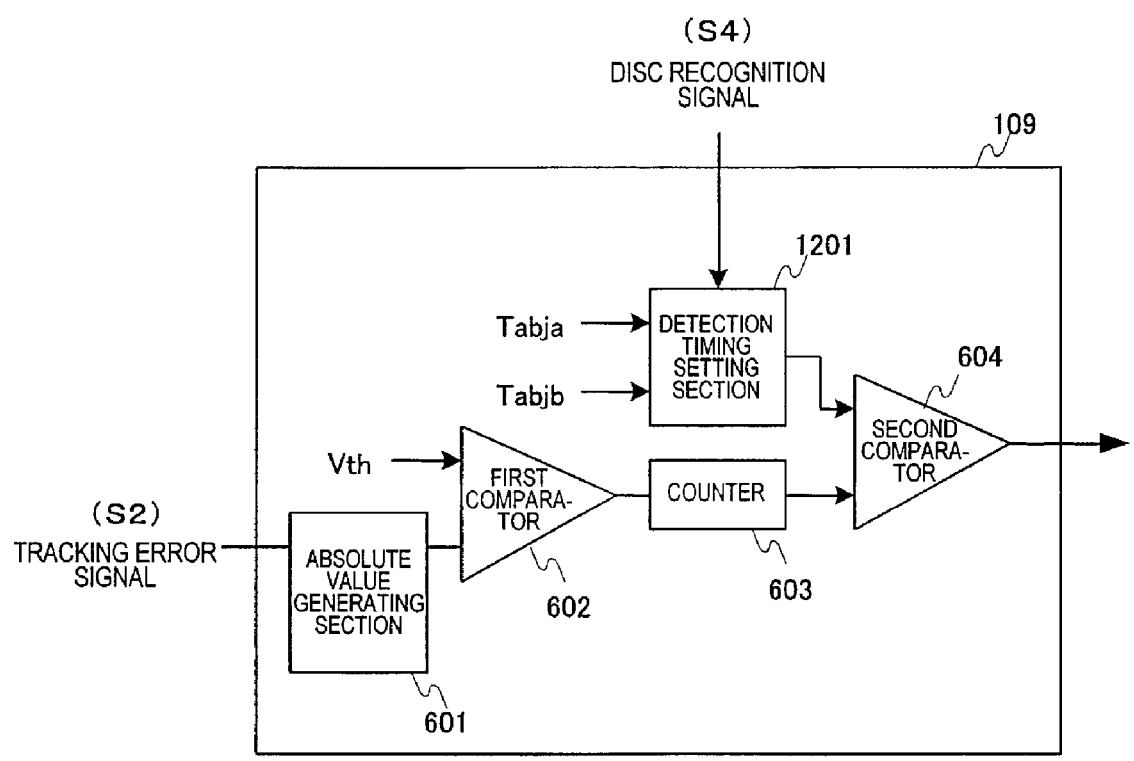
FIG. 12 is a block diagram illustrating a second track skipping detecting sensing according to a fifth preferred embodiment of the present invention.

Next, exemplary configuration and operation of the second track skipping detecting section 109 will be described with reference to FIG. 12.

When the second track skipping detecting section 109 receives the tracking error signal S2, its internal absolute value generating section 601 generates the absolute value of the tracking error signal S2. A first comparator 602 compares the absolute value of the tracking error signal S2 to a predetermined level Vth. If the tracking error signal S2 is either equal to or greater than Vth or equal to or smaller than −Vth, the first comparator 602 outputs "one". Otherwise, the first comparator 602 outputs "zero".

A counter 603 counts the number of "one" periods of the output of the first comparator 602 at regular intervals and resets the count when the output of the first comparator 602 goes zero. In this manner, the counter 603 detects the time width of the "one" periods. If the incoming optical disc recognition signal S4 is one (which means that the given optical disc is a rewritable disc), a detection timing setting section 1201 outputs Tabja. On the other hand, if the incoming optical disc recognition signal S4 is zero (which means that the given optical disc is a write-once disc), the detection timing setting section 1201 outputs Tabjb. In this example, Tabjb is supposed to be greater than Tabja. A second comparator 604 outputs zero if the detected value of the counter 603 is equal to or smaller than the output of the detection timing setting section 1201 but outputs one if the detected value of the counter 603 exceeds the output of the detection timing setting section 1201.

As a result, if the given optical disc is a rewritable disc, the second track skipping detecting section 109 outputs "one" when the tracking error signal S2 continues to be either equal to or greater than Vth or equal to or smaller than −Vth for more than a first predetermined period of time (Tabja), but outputs "zero" otherwise. On the other hand, if the given optical disc is a write-once disc, the second track skipping detecting section 109 outputs "one" when the tracking error signal S2 continues to be either equal to or greater than Vth or equal to or smaller than −Vth for more than a second predetermined period of time (Tabjb), but outputs "zero" otherwise. Tabjb is defined to be greater than Tabja. That is why if the given optical disc is a write-once disc, the track skipping is not detected unless the tracking error signal varies for a longer time than the situation where the given optical disc is a rewritable disc.

Optionally, if Tabjb is defined to be a sufficiently large value (e.g., greater than a tracking servo response time), the detection of track skipping based on the tracking error signal may be disabled.

In the various preferred embodiments of the present invention described above, the operations to be done by the disc recognizing section 110, the first track skipping detecting section 108, the second track skipping detecting section 109, 701, or 902, the OR circuit 111, the control section 112, the write time counting section 702, the alternative processing control section 901 and so on may be carried out with hardware and/or software. The functions of these sections are realized by appropriately designing a program for the optical disc controller.

Optionally, not just by recognizing the type of a given optical disc as a write-once disc or a rewritable disc but also by collecting the write rate information, the vender information, the format information and other sorts of information about the given optical disc that may be a write-once disc or a rewritable disc, those Vtha, Tabj and other values may be changed based on those pieces of information collected. If necessary, those values may be changed on a layer-by-layer basis in a multilayer optical disc.

Also, various preferred embodiments of the present invention described above may be combined with each other. For example, an optical disc recorder with a built-in hard disc drive may be designed so as to select the best track skipping detection signal depending on whether a program on the hard disc, which is going to be edited and dubbed onto an optical disc, is a copy-once one or a copy-free one. Specifically, if a copy-once program were dubbed through the end without detecting track skipping successfully, the program information on the hard disc would be erased and no longer available. That is why if the settings are adjusted so as to detect track skipping during writing as easily as in a rewritable disc, the program can be dubbed without missing any part of it. Conversely, as for a copy-free one, the program often stays on the hard disc unless the user erases it intentionally. In that case, by adjusting the settings so as to detect track skipping during writing no less easily than in a write-once disc, dubbing can be done as quickly as possible.

INDUSTRIAL APPLICABILITY

An optical disc drive according to the present invention can be used extensively on an industrial basis as a consumer electronic appliance such as a recorder or an office automation unit such as a data storage device. Also, an optical disc controller and a method for driving an optical disc drive according to the present invention are applicable to various types of optical disc drives.

The invention claimed is:

1. An optical disc drive having the ability to write data on both a write-once disc and a rewritable disc, the drive comprising:
    disc recognizing means for recognizing the type of a given optical disc as a write-once disc or a rewritable disc;
    track skipping detection signal generating means for outputting track skipping detection signal when a first condition on tracking error is satisfied if the given optical disc, on which data is being written, has turned out to be a write-once disc or when a second condition on tracking error, which is different from the first condition, is satisfied if the given optical disc has turned out to be a rewritable disc; and
    a control section for stopping writing the data on receiving the track skipping detection signal while the data is being written,
    wherein the track skipping detection signal generating means includes:
        first track skipping detecting means for generating a first detection signal on detecting track skipping by discontinuity of physical addresses; and
        second track skipping detecting means for generating a second detection signal on detecting track skipping based on a tracking error signal, and
    wherein if the disc recognizing means has recognized the given optical disc as a write-once disc, the second track skipping detecting means is either disabled or inactivated.

2. The optical disc drive of claim 1, wherein if the given optical disc is a write-once disc that accepts alternative processing about writing, the second condition is applied instead of the first condition on tracking error.

3. The optical disc drive of claim 1, wherein the first condition is that physical addresses being read while the data is being written have any discontinuity.

4. The optical disc drive of claim 1, wherein the second condition is that the addresses being read while the data is being written have any discontinuity or that the absolute value of a tracking error signal exceeds a predetermined value.

5. The optical disc drive of claim 1, wherein the track skipping detection signal generating means includes detection timing setting means for setting a timing to determine that track skipping has occurred, and
    wherein the timings to be set by the detection timing setting means are changed based on a result of the decision made by the disc recognizing means, and
    wherein the timing to be set where the disc recognizing means recognizes the given optical disc as a write-once disc is defined to be later than the timing to be set where the disc recognizing means recognizes the given optical disc as a rewritable disc.

6. The optical disc drive of claim 1, wherein if the given optical disc is a write-once disc, the control section stops writing the data on finding the second condition satisfied until a prescribed amount of time passes since the start of writing.

7. The optical disc drive of claim 6, comprising:
    write time counting means for counting the amount of time that has passed since the start of writing; and
    the track skipping detection signal generating means for generating the track skipping detection signal based on a result of the decision made by the disc recognizing means and on the amount of time passed that has been counted by the write time counting means, and
    wherein as soon as the track skipping detection signal generating means detects track skipping while the data is being written, the control section stops writing the data.

8. The optical disc drive of claim 7, wherein if the disc recognizing means has recognized the given optical disc as a write-once disc, the track skipping detection signal generating means either inactivates or disables the second track skipping detecting means from detecting track skipping toward an outer edge of the disc until the write time counting means counts the prescribed amount of time, but
    once the write time counting means has counted the prescribed amount of time, the track skipping detection signal generating means either inactivates or disables the second track skipping detecting means from detecting track skipping toward both inner and outer edges of the disc.

9. An optical disc controller for use in an optical disc drive having the ability to write data on both a write-once disc and a rewritable disc, wherein the optical disc controller includes hardware enabling the optical disc drive to stop writing data when a first condition on tracking error is satisfied if the given optical disc, on which the data is being written, has turned out to be a write-once disc or when a second condition on tracking error, which is different from the first condition, is satisfied if the given optical disc has turned out to be a rewritable disc, wherein the optical disc controller includes: first track skipping detecting section for generating a first detection signal on detecting track skipping by discontinuity of physical addresses; and second track skipping detecting section for generating a second detection signal on detecting track skipping based on a tracking error signal, and wherein if the given optical disc has turned out to be a write-once disc, the second track skipping detecting section is either disabled or inactivated.

10. A method for driving an optical disc drive having the ability to write data on both a write-once disc and a rewritable disc, the method comprising the steps of:
    recognizing a given optical disc as a write-once disc or a rewritable disc;
    outputting track skipping detection signal when a first condition on tracking error is satisfied if the given optical disc, on which data is being written, has turned out to be a write-once disc or when a second condition on tracking error, which is different from the first condition, is satisfied if the given optical disc has turned out to be a rewritable disc; and
    stopping writing the data on receiving the track skipping detection signal while the data is being written,
    wherein the step of outputting the track skipping detection signal includes:
        generating a first detection signal on detecting track skipping by discontinuity of physical addresses; and
        generating a second detection signal on detecting track skipping based on a tracking error signal, and
    wherein if the given optical disc is recognized as a write-once disc, generation of the second detection signal is either disabled or inactivated.

* * * * *